United States Patent
Kubo et al.

(10) Patent No.: US 8,469,500 B2
(45) Date of Patent: Jun. 25, 2013

(54) LIQUID CARTRIDGE AND LIQUID SUPPLYING DEVICE

(75) Inventors: Tomoyuki Kubo, Nagoya (JP); Hiroto Sugahara, Ama (JP); Masayuki Takata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 22 days.

(21) Appl. No.: 13/050,916

(22) Filed: Mar. 17, 2011

(65) Prior Publication Data
US 2011/0234716 A1    Sep. 29, 2011

(30) Foreign Application Priority Data

Mar. 26, 2010  (JP) ................................. 2010-072377

(51) Int. Cl.
  B41J 2/175    (2006.01)
  G01F 23/292   (2006.01)
(52) U.S. Cl.
  USPC .......................................................... 347/86
(58) Field of Classification Search
  USPC .......................................................... 347/86
  See application file for complete search history.

(56) References Cited

U.S. PATENT DOCUMENTS

| | | | | |
|---|---|---|---|---|
| 4,979,797 | A * | 12/1990 | Nemeth ........................... | 73/293 |
| 5,837,999 | A * | 11/1998 | Horiuchi .................. | 250/231.14 |
| 6,378,971 | B1 | 4/2002 | Tamura et al. | |
| 7,213,914 | B2 * | 5/2007 | Anma et al. ..................... | 347/86 |
| 2001/0024225 | A1 | 9/2001 | Ishizawa et al. | |
| 2002/0024543 | A1 | 2/2002 | Kimura et al. | |
| 2002/0089576 | A1 | 7/2002 | Ishizawa et al. | |
| 2002/0093556 | A1 | 7/2002 | Ishizawa et al. | |
| 2002/0196312 | A1 | 12/2002 | Ishizawa et al. | |
| 2003/0071874 | A1 | 4/2003 | Ishizawa et al. | |
| 2005/0134663 | A1 | 6/2005 | Sasaki et al. | |
| 2005/0146577 | A1 | 7/2005 | Sasaki et al. | |
| 2005/0146578 | A1 | 7/2005 | Takagi et al. | |
| 2005/0146579 | A1 | 7/2005 | Sasaki et al. | |
| 2005/0151812 | A1 | 7/2005 | Sasaki et al. | |
| 2005/0185034 | A1 | 8/2005 | Anma et al. | |

(Continued)

FOREIGN PATENT DOCUMENTS

| | | |
|---|---|---|
| EP | 1147902 A1 | 10/2001 |
| EP | 2103434 A1 | 9/2009 |

(Continued)

OTHER PUBLICATIONS

European Patent Office, extended European Search Report for European Patent Application No. 11158710.1 (counterpart European patent application), mailed Sep. 7, 2012.

*Primary Examiner* — Matthew Luu
*Assistant Examiner* — Alexander D Shenderov
(74) *Attorney, Agent, or Firm* — Baker Botts L.L.P.

(57) ABSTRACT

A liquid cartridge detachably loadable in a cartridge loading section of a liquid supplying device is provided. The liquid cartridge includes: a main body defining therewithin a liquid accommodation chamber storing liquid therein, the liquid accommodation chamber having a light-transmission portion transmitting light therethrough; a moving member disposed within the liquid accommodation chamber and configured to move in accordance with an amount of the liquid; a light outlet configured to move in conjunction with the movement of the moving member; and a light guiding portion configured to guide incident light toward the light outlet, the light outlet irradiating light coming from the light guiding portion outside of the main body via the light-transmission portion.

19 Claims, 14 Drawing Sheets

U.S. PATENT DOCUMENTS

| | | |
|---|---|---|
| 2005/0195225 A1 | 9/2005 | Takagi et al. |
| 2006/0001717 A1 | 1/2006 | Sasaki et al. |
| 2006/0028517 A1 | 2/2006 | Ishizawa et al. |
| 2006/0082622 A1 | 4/2006 | Yonekawa et al. |
| 2006/0082625 A1 | 4/2006 | Kotaki et al. |
| 2006/0087538 A1 | 4/2006 | Amma et al. |
| 2006/0290722 A1 | 12/2006 | Kitagawa et al. |
| 2007/0195140 A1 | 8/2007 | Ishizawa et al. |
| 2007/0236914 A1* | 10/2007 | Cox et al. ............ 362/101 |
| 2007/0273736 A1 | 11/2007 | Sasaki et al. |
| 2007/0279462 A1 | 12/2007 | Ishizawa et al. |
| 2008/0129804 A1 | 6/2008 | Fukushima et al. |
| 2008/0165214 A1 | 7/2008 | Yuen |
| 2008/0259356 A1* | 10/2008 | Lechuga Gomez et al. .. 356/622 |
| 2009/0122092 A1 | 5/2009 | Hatasa et al. |
| 2009/0244222 A1* | 10/2009 | Aoyama ............ 347/86 |
| 2010/0141719 A1 | 6/2010 | Fukushima et al. |
| 2010/0283821 A1 | 11/2010 | Ishizawa et al. |

FOREIGN PATENT DOCUMENTS

| | | |
|---|---|---|
| GB | 906609 A | 9/1962 |
| JP | S58-080532 A | 5/1983 |
| JP | S63-115757 A | 5/1988 |
| JP | S63-252747 A | 10/1988 |
| JP | 2001-191548 A | 7/2001 |
| JP | 2002-286530 A | 10/2002 |
| JP | 2004-268300 A | 9/2004 |
| JP | 2005-246781 A | 9/2005 |
| JP | 2005-313447 A | 11/2005 |
| JP | 2006-110946 A | 4/2006 |
| JP | 2006-116785 A | 5/2006 |
| JP | 2006-142483 A | 6/2006 |
| JP | 2006-142796 A | 6/2006 |
| JP | 2006-142818 A | 6/2006 |
| JP | 2006-159789 A | 6/2006 |
| JP | 2007-001210 A | 1/2007 |
| JP | 2007-001211 A | 1/2007 |
| JP | 2007-001212 A | 1/2007 |
| JP | 2007-245637 A | 9/2007 |

* cited by examiner

← FRONTWARD (LOADING DIRECTION)

FRONTWARD (LOADING DIRECTION)

LIQUID CARTRIDGE AND LIQUID SUPPLYING DEVICE

CROSS REFERENCE TO RELATED APPLICATION

This application claims priority from Japanese Patent Application No. 2010-072377 filed Mar. 26, 2010. The entire content of the priority application is incorporated herein by reference.

TECHNICAL FIELD

The present invention relates to a liquid cartridge that stores liquid therein and a liquid supplying device that accommodates therein the liquid cartridge.

BACKGROUND

There have been various proposals for detecting residual amounts of liquid stored in liquid cartridges. According to one of such techniques, a residual amount of liquid is detected by using a photosensor (photointerrupter) including a light-emitting element and a light-receiving element.

A technique to detect an amount of ink in an ink cartridge loaded in a cartridge loading portion of an inkjet printer is also known. Such an ink cartridge has a main body serving as an ink chamber, an arm movably provided within the ink chamber, a float and a shielding plate. The float is connected to one end of the arm so as to move in a vertical direction in accordance with an amount of ink in the ink chamber. The shielding plate is connected to another end of the arm so as to move in conjunction with vertical movement of the float.

The cartridge loading portion is provided with a sensor including a light-emitting element and a light-receiving element. The light-emitting element emits light toward the loaded ink cartridge, and the light-receiving element receives the light that was transmitted through the ink cartridge. When more than a predetermined amount of ink is left in the ink chamber, the shielding plate is at such a position that the shielding plate shuts off the light from the light-emitting element. Therefore, the light-receiving element does not receive the light from the light-emitting element through the ink cartridge. On the other hand, when the ink decreases below the predetermined amount, the shielding plates moves in accordance with the movement of the float so that the shielding plate no longer shuts off the light. As a result, the light emitted from the light-emitting element passes through the ink cartridge and is received at the light-receiving element. With this configuration, whether the predetermined amount of ink is left within the ink chamber can be detected based on changes in an amount of light received at the light-receiving element.

SUMMARY

However, in the above-described configuration, the position of the sensor (specifically, the position of the light-emitting element) is fixed for detecting the position of the shielding plate that moves in accordance with the amount of ink in the ink cartridge. Therefore, the above-described configuration only detects whether or not the shielding plate is positioned to shut off the light from the light-emitting element, i.e., whether or not the residual amount of ink is more than the predetermined amount (a single level of a liquid surface). In other words, more than two levels of liquid surfaces cannot be detected. Increasing a number of sensors can solve this problem, but employing an increased number of sensors directly leads to an increase in costs of the inkjet printer.

In view of the foregoing, it is an object of the present invention to provide a liquid cartridge and a liquid supplying device capable of detecting residual amounts of liquid at a plurality of levels.

In order to attain the above and other objects, the present invention provides a liquid cartridge detachably loadable in a cartridge loading section of a liquid supplying device. The liquid cartridge includes: a main body defining therewithin a liquid accommodation chamber storing liquid therein, the liquid accommodation chamber having a light-transmission portion transmitting light therethrough; a moving member disposed within the liquid accommodation chamber and configured to move in accordance with an amount of the liquid; a light outlet configured to move in conjunction with the movement of the moving member; and a light guiding portion configured to guide incident light toward the light outlet, the light outlet irradiating light coming from the light guiding portion outside of the main body via the light-transmission portion.

According to another aspect of the present invention, there is provided a liquid cartridge detachably loadable in a cartridge loading section of a liquid supplying device. The liquid cartridge includes: a main body defining therewithin a liquid accommodation chamber storing liquid therein, the liquid accommodation chamber having a light-transmission portion transmitting light therethrough; a moving member disposed within the liquid accommodation chamber and configured to move in accordance with an amount of the liquid; a light-emitting element configured to emit light and move in conjunction with the movement of the moving member; and a light outlet configured to irradiate the light emitted from the light-emitting element toward outside of the main body via the light-transmission portion.

According to still another aspect of the present invention, there is provided a liquid supplying device that includes: a liquid cartridge; a cartridge loading section configured to accommodate therein the liquid cartridge; and a light-emitting element configured to emit light toward the liquid cartridge. The liquid cartridge includes: a main body defining therewithin a liquid accommodation chamber storing liquid therein, the liquid accommodation chamber having a light-transmission portion transmitting light therethrough; a moving member disposed within the liquid accommodation chamber and configured to move in accordance with an amount of the liquid; a light outlet configured to move in conjunction with the movement of the moving member; and a light guiding portion configured to guide the light emitted from a light-emitting element toward the light outlet, the light outlet irradiating the light coming from the light guiding portion outside of the main body via the light-transmission portion.

According to further aspect of the present invention, there is provided a liquid supplying device that includes a liquid cartridge and a cartridge loading section configured to accommodate therein the liquid cartridge. The liquid cartridge includes: a main body defining therewithin a liquid accommodation chamber storing liquid therein, the liquid accommodation chamber having a light-transmission portion transmitting light therethrough; a moving member disposed within the liquid accommodation chamber and configured to move in accordance with an amount of the liquid; a light-emitting element configured to emit light and move in conjunction with the movement of the moving member; and a light outlet configured to irradiate the light emitted from the

DETAILED DESCRIPTION

First, a configuration in the vicinity of an ink supplying device 8 of an inkjet printer 1 that is common to all embodiments and modifications of the present invention will be described with reference to FIG. 1. The terms "upward", "downward", "upper", "lower", "above", "below", "beneath", "right", "left", "front", "rear" and the like will be used throughout the description assuming that the inkjet printer 1 is disposed in an orientation in which it is intended to be used.

Figure 1:
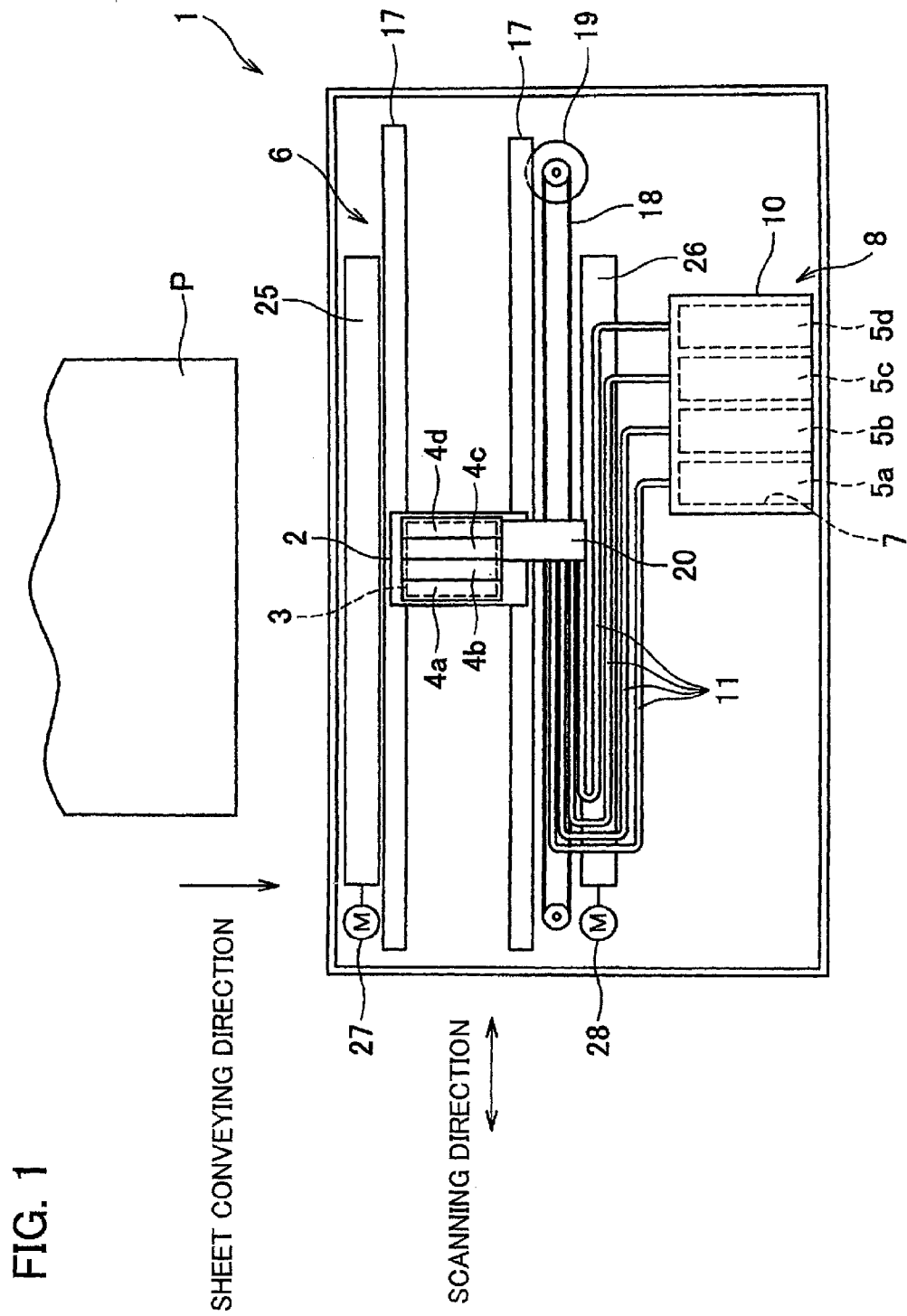
FIG. 1 is a plan view schematically illustrating a configuration in the vicinity of an ink supplying device that is common to all embodiments and modifications of the present invention.

In the inkjet printer 1, a carriage 2, an inkjet head 3, four sub tanks 4a, 4b, 4c, 4d, the ink supplying device 8 and a sheet conveying unit 6 are provided, as shown in FIG. 1. Four ink cartridges 5a, 5b, 5c 5d according to all embodiments and modifications are detachably loadable in the ink supplying device 8.

The carriage 2 is adapted to make reciprocal movements with respect to a scanning direction indicated by a two-way arrow in FIG. 1, which is parallel to a left-to-right direction in FIG. 1. Two guide shafts 17 are disposed and extend in a direction parallel to the left-to-right direction for guiding the reciprocal movements of the carriage 2 along the guide shafts 17. An endless belt 18 is connected to the carriage 2 and a carriage drive motor 19 is disposed for driving the endless belt 18. The carriage 2 is thus allowed to reciprocally move with respect to the scanning direction in conjunction with movement of the endless belt 18.

The carriage 2 includes the inkjet head 3 and the four sub tanks 4a, 4b, 4c and 4d. The inkjet head 3 has a lower surface (a surface opposite to a top surface shown in FIG. 1) on which a plurality of nozzles is provided for ejecting ink droplets onto a sheet P conveyed by the sheet conveying unit 6. The sub tanks 4a, 4b, 4c, 4d are juxtaposed in the scanning direction and are integrally connected to a tube joint 20. Four flexible tubes 11 are connected to the tube joint 20 so that each of the four sub tanks 4a, 4b, 4c, 4d can be connected to each of the four ink cartridge 5a, 5b, 5c, 5d loaded in the ink supplying device 8 via the corresponding tubes 11.

The ink supplying device 8 includes a holder 10 in which four cartridge loading portions 7 are provided for accommodating therein respective one of the four ink cartridges 5a, 5b, 5c, 5d. The ink cartridges 5a, 5b, 5c, 5d respectively store one of four colors of ink: black, yellow, cyan, and magenta, for example. All the four ink cartridges 5a, 5b, 5c, 5d have configurations identical to one another except that each accommodates ink of a different color. Each of the four ink cartridges 5a, 5b, 5c, 5d is detachably insertable into the corresponding cartridge loading portion 7 of the holder 10. In this way, the ink cartridges 5a, 5b, 5c, 5d are detachably loadable in and unloaded from the holder 10. Each of the four colors of ink stored in one of the ink cartridges 5a, 5b, 5c, 5d is supplied to one of the four sub tanks 4a, 4b, 4c, 4d via the corresponding tubes 11, temporarily stored in respective sub tanks 4a, 4b, 4c, 4d, and then supplied to the inkjet head 3. While the inkjet head 3 makes reciprocal movements in the scanning direction along with the carriage 2, the ink supplied to the inkjet head 3 is ejected therefrom in a form of fine droplets onto the sheet P via the plurality of nozzles.

The sheet conveying unit 6 serves to convey the sheet P in a sheet conveying direction as indicated in FIG. 1. The sheet conveying unit 6 includes two sheet feed rollers 25 and 26. The sheet feed roller 25 is disposed upstream of the inkjet head 3, while the sheet feed roller 26 is disposed downstream of the inkjet head 3 in the sheet conveying direction. The sheet feed roller 25 is driven by a sheet feed motor 27, and the sheet feed roller 26 is driven by a sheet discharge motor 28. In the sheet conveying unit 6, the sheet feed roller 25 conveys the sheet P to the inkjet head 3 in the sheet conveying direction (toward downward in FIG. 1), and the sheet feed roller 26 discharges the sheet P on which an image and/or texts are formed by the inkjet head 3 further downward in FIG. 1.

Next, an ink cartridge 5 according to a first embodiment of the present invention will be described with reference to FIGS. 2 to 3B. The ink cartridge 5 is an illustrative example of the four ink cartridges 5a, 5b, 5c, 5d loadable in the inkjet printer 1. In the following description, a left side of FIG. 2 will be defined as a front side and a right side of FIG. 2 will be defined as a rear side. The ink cartridge 5 is loaded in the holder 10 in a loading direction (indicated by an arrow in FIG. 2), i.e., toward the front side, and unloaded from the holder 10 in an unloading direction opposite to the loading direction i.e., toward the rear side in FIG. 2.

The ink cartridge 5 includes a main body 30 that defines an ink chamber 33 therein, and an arm member 31 movably disposed within the ink chamber 33.

The main body 30 is formed of a material having light transmissive characteristic, such as synthetic resin. The ink chamber 33 stores ink therein and is formed within the main body 30.

The main body 30 has a rear wall 34 (trailing side in the loading direction) that projects outward (rearward), and has an arcuate-shape (circular arc shape) in vertical cross-section. The main body 30 has a front wall 36 on which an ink outlet port 37 and an air communication port 38 are formed, as shown in FIG. 2. The ink outlet port 37 is provided at a lower end of the front wall 36 for allowing ink in the ink chamber 33 to flow out of the ink chamber 33. A ring-shaped sealing member 39 is provided on the front wall 36 such that the sealing member 39 surrounds the ink outlet port 37. The sealing member 39 is formed of a material having a sealing capability, such as rubber. The air communication port 38 is disposed at an upper end of the front wall 36. The air communication port 38 is in fluid communication with an upper space formed within the ink chamber 33 to introduce an external air into the ink chamber 33.

The arm member 31 is movably disposed within the ink chamber 33. The arm member 31 includes a float 40, an arm 41, a pivot-center portion 42 and a protruding portion 43, as shown in FIG. 2. The arm 41 has one end connected to one side of the float 40 and another end connected to the pivot-center portion 42. The protruding portion 43 has one end connected to another side of the float 40, the another side of the float 40 being opposite to the one side to which the arm 41 is connected. In this way, the float 40, the arm 41, the pivot-center portion 42 and the protruding portion 43 integrally constitute the arm member 31. The float 40 and the protruding portion 43 correspond to a moving member of the present embodiment.

Figure 2:
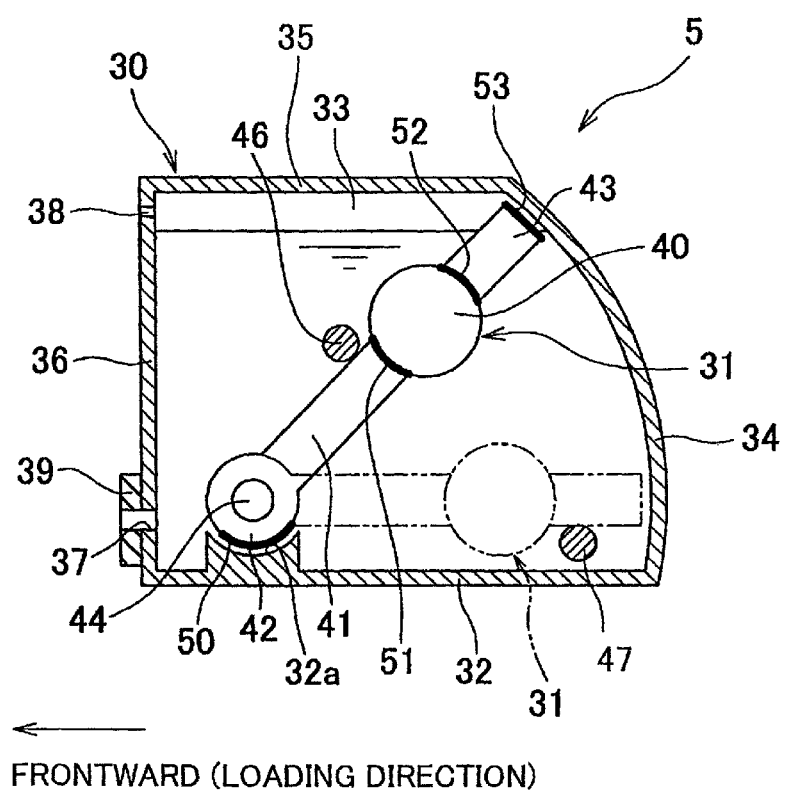
FIG. 2 is a vertical cross-sectional view of the ink cartridge according to a first embodiment of the present invention taken along a plane including a loading direction of the ink cartridge.

The pivot-center portion 42 has a spherical shape as a whole and therefore a substantially circular shape in vertical cross-section, as shown in FIG. 2. The pivot-center portion 42 has a central portion through which a shaft 44 penetrates. The shaft 44 is supported to a pair of side walls (now shown) of the main body 30 (walls disposed in parallel to a plane of FIG. 2). With this configuration, the float 40 (the arm member 31) is pivotally movable about the shaft 44 with respect to a vertical direction.

As shown in FIG. 2, the main body 30 has an upper wall 35 and a bottom wall 32 whose inner surface is formed with a protruding portion at a position in confrontation with the pivot-center portion 42. The protruding portion protrudes upward from the inner surface of the bottom wall 32 and has a smoothly inwardly-curved concave-shaped surface (top surface) 32a in conformance with the arcuate-shaped (circular arc shaped) outline of the pivot-center portion 42. The concave-shaped surface 32a and the pivot-center portion 42 define a prescribed gap therebetween.

The protruding portion 43 protrudes from a portion 52 of the float 40 in a direction coincident with an extension of the arm 41, the portion 52 being opposite to a portion 51 of the float 40 to which the arm 41 is connected. The protruding portion 43 has a tip end 53 facing and spaced away from the rear wall 34 by a prescribed distance, for example, from 0.5 mm to 1 mm.

Within the ink chamber 33, two stoppers 46, 47 are provided for restricting the pivotal movement of the float 40 (the arm 41). The stopper 46 serves to prevent the float 40 (the arm 41) from pivotally move further upward (an upper-limit position of the float 40 indicated by a solid line in FIG. 2), and the stopper 47 serves to prevent the float 40 (the arm 41) from pivotally move further downward (a lower-limit position of the float 40 indicated by a two-dashed chain line in FIG. 2).

Figure 3A:
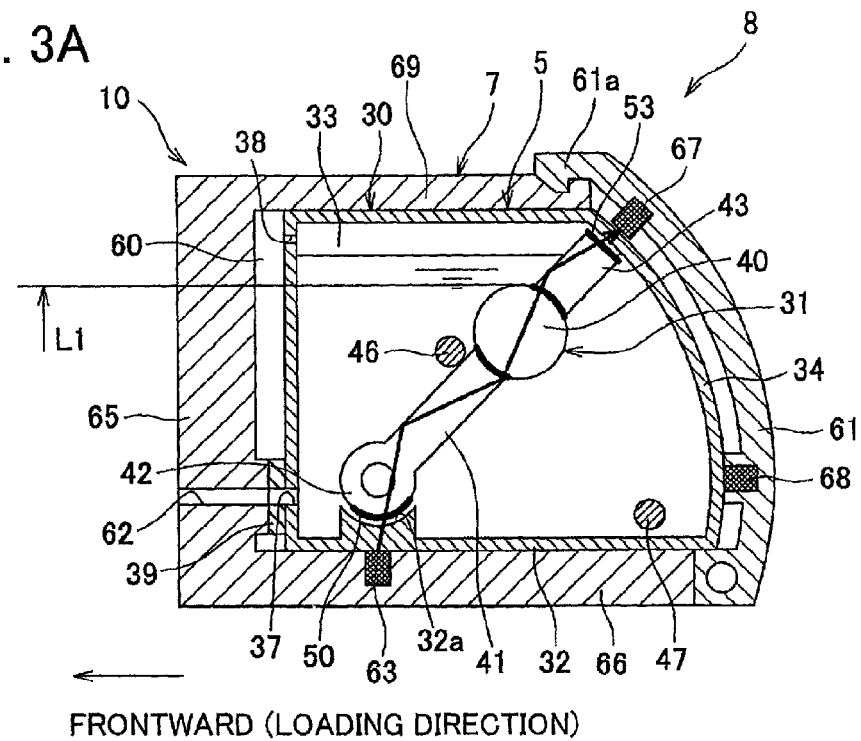
FIG. 3A is a vertical cross-sectional view of the ink cartridge and a cartridge loading portion according to the first embodiment, wherein the ink cartridge stores a sufficient amount of ink therein.

More specifically, when sufficient ink is stored in the ink chamber 33 (i.e., an ink level is higher than or equal to a first liquid level L1 shown in FIG. 3A), the arm 41 is in contact with the stopper 46 due to moment acting on the arm 41 in a counterclockwise direction caused by buoyancy of the float 40. As a result, the float 40 and the arm 41 are restricted from moving further upward and maintained at the upper-limit position, as show in FIG. 3A. When the ink decreases and the ink level falls below the first liquid level L1, a portion of the float 40 starts to appear from the ink surface, and the buoyancy acting on the float 40 starts to decrease. Therefore, as the ink level lowers, the float 40 and the arm 41 pivotally move in a clockwise direction in FIG. 3. In the meantime, in accordance with the pivotal movement of the float 40 and the arm 41 in the vertical direction, the protruding portion 43 moves along the rear wall 34 (more specifically, an inner wall of the rear wall 34), while maintaining the prescribed distance therefrom. When the ink is further reduced and the ink chamber 33 becomes near empty (i.e., the ink level falls below a second liquid level L2 shown in FIG. 3B), the protruding portion 43 contacts the stopper 47. The arm member 31 is thus restricted from moving further downward and maintained at the lower-limit position, as shown in FIG. 3B.

Figure 3B:
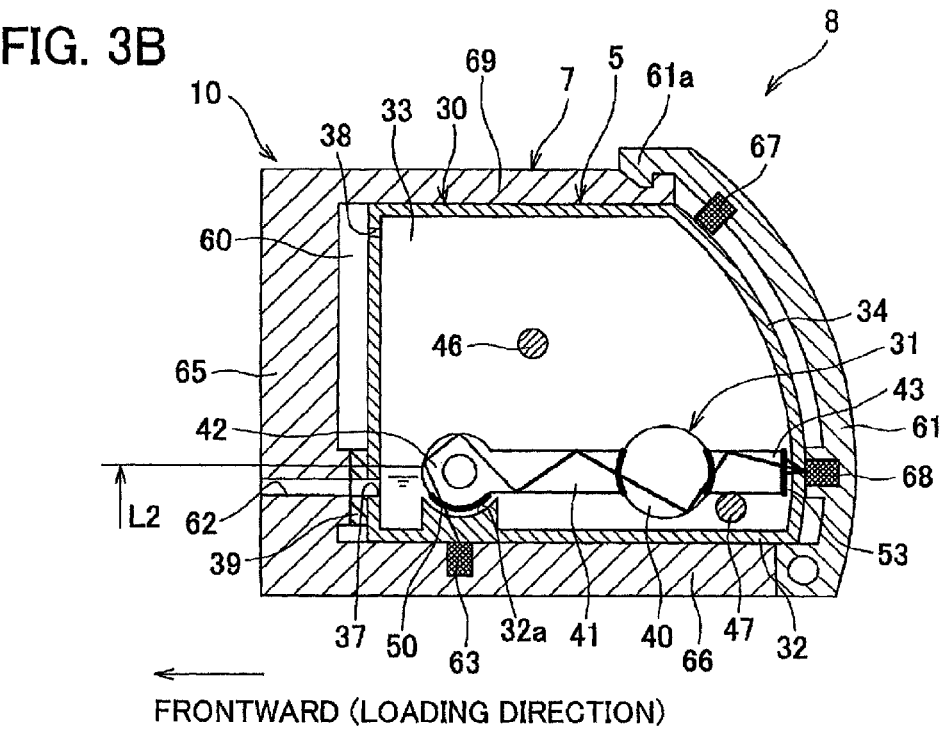
FIG. 3B is a vertical cross-sectional view of the ink cartridge and the cartridge loading portion according to the first embodiment, wherein the ink cartridge stores a small amount of ink therein.

The pivot-center portion 42 is positioned to face a light-emitting element 63 that is disposed at a bottom wall section 66 of the cartridge loading portion 7, as shown in FIGS. 3A and 3B. The arm 41 receives light emitted from the light-emitting element 63, guides the incident light to the float 40 through the arm 41, and the protruding portion 43 finally irradiates the light from the tip end 53 to outside of the main body 30. More specifically, as illustrated by heavy lines in FIGS. 3A and 3B, the pivot-center portion 42 has a lower portion 50 in confrontation with the concave-shaped surface 32a of the protruding portion of the bottom wall 32. This lower portion 50 has light-transmissive characteristics and is adapted to receive the light from the light-emitting element 63. This lower portion 50 thus serves as an inlet of the light. The portion 51 connecting the arm 41 and the float 40, and the portion 52 connecting the float 40 and the protruding portion 43 also have light-transmissive characteristics. The tip end 53 of the protruding portion 43 also has light-transmissive characteristics and serves as an outlet of the light. Other portions of the arm member 31 (portions other than the light inlet 50, the connecting portions 51, 52 and the light outlet 53) have inner surfaces that can reflect light, and correspond to a third portion of the present invention. The portions 51, 52 correspond to a first portion and a second portion of the present embodiment respectively.

With the above-described configuration, light emitted from the light-emitting element 63 enters into the arm member 31 via the light inlet 50 of the pivot-center portion 42, and is then guided to the float 40 while being reflected by the inner surfaces of the arm 41, and is finally irradiated from the light outlet 53 of the protruding portion 43 toward the rear wall 34 of the main body 30. A possible light path along which the incident light travels through the arm member 31 is shown such as a thick zigzag line in FIGS. 3A and 3B. The rear wall 34 corresponds to a light-transmission portion of the present embodiment. The arm 41 corresponds to a light guiding portion of the present embodiment.

The protruding portion 43 may be dispensed with. In this case, the light outlet 53 may be formed on the float 40 directly. However, since the protruding portion 43 protruding from the float 40 is provided with the light outlet 53 in the present embodiment, light can travel through the protruding portion 43 extending in one direction before being irradiated outside of the main body 30. Therefore, incident light is allowed to travel in a relatively straightforward manner until being irradiated from the light outlet 53, compared to the case in which the protruding portion 43 is not provided. As a result, the light irradiated from the light outlet 53 is hard to be radiated.

The reflectivity of the inner surfaces of the arm member 31 can be realized by performing a reflexible coating, such as nickel, on prescribed regions of the inner surfaces of the arm member 31. Alternatively, portions that require light reflectivity may have a double-layered structure: a core layer having a high refractive index is coated with another layer having a low refractive index. With this double-layered structure, light can travel based on total internal reflection, that is, from the layer with high refractive index toward the layer with low refractive index.

Next, details of the holder 10 (the cartridge loading portion 7) will be described with reference to FIGS. 3A and 3B. As described before, the holder 10 is provided with four cartridge loading portions 7 aligned in a direction parallel to the scanning direction (see FIG. 1). Since the four cartridge loading portions 7 have configurations identical to one another, one of the cartridge loading portions 7 will only be described hereinafter.

As shown in FIGS. 3A and 3B, the cartridge loading portion 7 defines therewithin a cartridge accommodating chamber 60, and includes a cover 61. The cartridge accommodating chamber 60 has an opening facing rearward, and the cover 61 is configured to cover the opening to cover the ink cartridge 5 accommodated within the cartridge accommodating chamber 60. The ink cartridge 5 is inserted into the cartridge accommodating chamber 60 through the opening when the cover 61 is opened.

The holder 10 has a front wall section 65 constituting the cartridge accommodating chamber 60. The front wall section 65 is formed with an ink introduction path 62 extending in the loading direction and penetrating through the front wall section 65. The ink introduction path 62 is connected to the inkjet head 3 via one of the tubes 11. The ink introduction path 62 is in fluid communication with the ink outlet port 37 of the ink cartridge 5 via the sealing member 39 when the ink cartridge 5 is accommodated within the cartridge accommodating chamber 60. In this way, the ink flowing out of the ink chamber 33 through the ink introduction path 62 is introduced to the inkjet head 3 via the tube 11.

The holder 10 has an upper wall section 69 and the bottom wall section 66 constituting the cartridge accommodating chamber 60. The light-emitting element 63 is disposed on the bottom wall section 66 for emitting light upward toward the loaded ink cartridge 5. More specifically, as shown in FIG. 3A, the light-emitting element 63 is disposed at a position vertically below the concave-shaped surface 32a formed on the bottom wall 32 of the ink cartridge 5. In other words, the light inlet 50 provided on the pivot-center portion 42 of the arm member 31 is in confrontation with the light-emitting element 63 so that the light emitted from the light-emitting element 63 can be received at the light inlet 50. The light emitted from the light-emitting element 63 passes through the bottom wall 32 of the ink cartridge 5 and is irradiated toward the arm member 31 via the concave-shaped surface 32a. The irradiated light travels through the ink available between the arm member 31 and the bottom wall 32, and enters into the arm member 31 through the light inlet 50. The light is then guided within and along the arm member 31 to the float 40, and finally irradiated outside of the ink cartridge 5 from the light outlet 53 of the protruding portion 43 extending from the float 40.

As described above, the light is irradiated toward outside of the main body 30 of the ink cartridge 5 from the light outlet 53 that moves in accordance with the amount of the ink in the ink chamber 33. Therefore, a position on the rear wall 34 from which the light from the light outlet 53 is emanated before being irradiated outward can vary depending on the residual amounts of ink within the ink chamber 33.

Specifically, as shown in FIG. 3A, when the amount of ink is more than first liquid level L1, the float 40 is positioned at its upper-limit position. Therefore, the light irradiated from the light outlet 53 passes an upper portion of the rear wall 34 and exits diagonally upward and rearward. When the ink is reduced to fall below the second liquid level L2, as shown in FIG. 3B, the float 40 is at the lower-limit position. The light passes a lower portion of the rear wall 34 and exits horizontally toward rearward.

The cover 61 has an arcuate-shape (circular arc shape) in vertical cross-section in conformance with the rear wall 34 of the ink cartridge 5 that is loadable in the cartridge accommodating chamber 60. The cover 61 has a lower end that is pivotably movably supported to the bottom wall section 66. The cover 61 is therefore pivotally movable between an open position (not shown) in which the cartridge accommodating chamber 60 is exposed and a closed position (FIGS. 3A and 3B) in which the rear wall 34 of the loaded ink cartridge 5 is covered. The cover 61 is provided with an engaging portion 61a that is engagable with the upper wall portion 69 of the holder 10. The cover 61 is locked at the closed position due to the engagement of the engaging portion 61a with the upper wall section 69.

The cover 61 has an inner surface on which two light-receiving elements 67, 68 are provided. The two light-receiving elements 67, 68 are disposed at positions different from each other in the vertical direction along which the float 40 pivotally moves. More specifically, the light-receiving element 67 is disposed at a position facing and in contact with the upper portion of the rear wall 34 of the ink cartridge 5 when the cover 61 is closed. The light-receiving element 68 is disposed at a position facing and in contact with the lower portion of the rear wall 34 of the ink cartridge 5 when the cover 61 is closed. With this arrangement, the inkjet printer 1 can detect two kinds of liquid levels (L1 and L2) based on signals outputted from the light-receiving elements 67, 68 in accordance with amounts of light received at the light-receiving elements 67, 68. That is, the light-receiving elements 67, 68 are aligned in the vertical direction along which the light outlet 53 (the float 40 and the protruding portion 43) moves in accordance with the amount of liquid within the ink chamber 33. The vertical direction corresponds to a moving direction of the present invention.

Specifically, when the residual amount of ink is more than the first liquid level L1 and the float 40 is at the upper-limit position as shown in FIG. 3A, the light-receiving element 67 receives the light irradiated from the light outlet 53. The light-receiving element 67 outputs a signal indicating that a sufficient amount of ink is left in the ink chamber 33 in response to receipt of the light from the light outlet 53. The inkjet printer 1 can therefore detect that the sufficient mount of ink is left in the ink chamber 33 based on the signal from the light-receiving element 67. On the other hand, when the residual amount of ink is smaller than the second liquid level L2 and the float 40 reaches the lower-limit position as shown in FIG. 3B, the light-receiving element 68 receives the light emitted from the light outlet 53. The inkjet printer 1 can therefore detect that there is little amount of ink left in the ink chamber 33 based on a signal outputted from the light-receiving element 68 in response to receipt of the light at the light-receiving element 68.

A user manually operates to open or close the cover 61 for mounting or dismounting the ink cartridge 5. If the user may touch either one or both of the light-receiving elements 67, 68 upon operation of the cover 61, sensitivity of the touched light-receiving elements 67, 68 could be lowered due to contamination. However, since the light-receiving elements 67, 68 are disposed at the inner surface of the arcuate-shaped cover 61 in the first embodiment, as long as the user operates normally, there is a lower possibility that the user may touch either the light-receiving element 67 or the light-receiving element 68. Further, since the light-receiving elements 67, 68 are arranged to be in contact with the rear wall 34 of the ink cartridge 5, the ink cartridge 5 can be reliably fixed within the cartridge loading portion 7. It should be noted that, in view of the single function to receive the light irradiated from the light outlet 53, the light-receiving elements 67, 68 may simply be respectively positioned to face the rear wall 34 of the ink cartridge 5, and may not necessarily be brought into contact with the rear wall 34 of the ink cartridge 5.

With the above-described configuration, depending on the light irradiated out of the light outlet 53 in accordance with the remaining amounts of ink in the ink chamber 33, two different positions of the float 40, namely, two different ink levels (the first liquid level L1 and the second liquid level L2), can be detected at the inkjet printer 1. Although two light-receiving elements 67, 68 are provided in the first embodiment, more than two light-receiving elements may be vertically arranged on the cover 61 so that more than two ink levels can be detected.

According to the conventional ink level detection system in which only one ink level can be detected, the detected amount of ink is such an amount at which the float starts to move due to the float's exposure from a liquid surface of the ink (corresponding to the first liquid level L1 in the first embodiment). Therefore, such a state where there is little amount of ink (corresponding to the second liquid level L2 in the first embodiment) cannot be detected. In other words, since the ink still remains within the ink cartridge even after a near empty state (a state where a substantial amount of ink has decreased) has been detected, the conventional printer is required to predict how much ink is left in order to use up the ink remained in the ink cartridge. Specifically, the conventional printer first starts to predict amounts of ink consumed at the inkjet head (amount of ink ejected from the nozzles, amount of ink discharged during maintenance and so on) after detection of the near empty state, and then accumulates the presumed ink consumption amounts to predict the residual amount of ink in the ink cartridge. However, the presumed ink consumption amount sometimes varies from an amount of ink that has actually been consumed. Improved accuracy in detecting the residual amount of ink has therefore been sought for.

In contrast, in the above-described first embodiment, the position of the float 40 can be detected in accordance with the residual amount of ink. The state of FIG. 3B in which there is almost no ink left in the ink chamber 33 can also be detected directly. Therefore, the ink in the ink cartridge 5 can all be used up.

Further, in the first embodiment, the light-emitting element 63 is disposed outside of the ink chamber 33 (on the bottom wall section 66 of the cartridge loading portion 7), not within the ink chamber 33. Therefore, wirings for supplying power to the light-emitting element 63 can be easily connected to the light-emitting element 63, compared to a case where the light-emitting element 63 is disposed on the float 40 within the ink chamber 33. Electrical configurations for supplying power to the light-emitting element 63 thus become easier in the first embodiment.

Further, when the remaining amount of ink is sufficient (more than the first liquid level L1), the light is irradiated upward (diagonally upward) from the light outlet 53 of the protruding portion 43 protruding diagonally upward from the float 40. The light-receiving element 67 is disposed substantially upward of the ink cartridge 5 (specifically, at an upper portion of the cover 61 that can be in confrontation with the upper portion of the rear wall 34 from which the irradiated light is emanated) such that the light-receiving element 67 can receive the light irradiated from the light outlet 53.

If there is ink between the light outlet 53 and the main body 30 (the rear wall 34) of the ink cartridge 5, the amount of ink that can be received at the light-receiving element 67 inevitably decreases. However, in the first embodiment, since the ink chamber 33 is provided with the air communication port 38 for introducing air into the ink chamber 33, a layer of air constantly exits at an upper portion of the ink chamber 33 even though the sufficient amount of ink is stored within the ink chamber 33. As a result, the light irradiated diagonally upwardly from the light outlet 53 can be reliably received at the light-receiving element 67 without being interrupted by the ink within the ink chamber 33. Enhanced detection accuracy can be therefore realized at the light-receiving element 67.

Further, the rear wall 34 of the ink cartridge 5, which is positioned at a trailing side in the loading direction, has light-transmissive characteristics and light is irradiated from the light outlet 53 toward the rear wall 34 in the present embodiment. Therefore, when the cover 61 is opened, the user can visually confirm how much ink has been left by observing the light irradiated toward the rear wall 34 that is positioned close to the user (at a near side of the user).

Further, the pivot-center portion 42 of the first embodiment is stationary positioned within the ink chamber 33 irrespective of the position of the float 40 (regardless of the pivotal movement of the arm member 31) and the light inlet 50 on which the light from the light-emitting element 63 is incident is provided on the stationary pivot-center portion 42 to be in confrontation with the light-emitting element 63.

Suppose that a distance between the arm member 31 and the light-emitting element 63 may vary due to the pivotal movement of the arm member 31. In this case, as the distance is longer, the light emitted from the light-emitting element 63 becomes harder to be incident on the light inlet 50 of the arm member 31. Further, since the distance varies depending on the pivotal movement of the arm member 31, guiding the light into the arm member 31 reliably and at a constant intensity also becomes more difficult, leading to fluctuations of the intensity of light irradiated from the light outlet 53.

Contrary thereto, since the stationary pivot-center portion 42 is in confrontation with the light-emitting element 63 in the first embodiment, the light emitted from the light-emitting element 63 can be constantly guided to the light outlet 53 via the arm 41, regardless of the pivotal movement of the arm member 31.

Further, the pivot-center portion 42 has a spherical shape and therefore the lower portion of the pivot-center portion 42 on which light from the light-emitting element 63 is incident (the light inlet 50) has an arcuate-shaped outline projecting toward the light-emitting element 63. With this configuration, the distance between the light inlet 50 and the light-emitting element 63 can be kept relatively constant, which enables the light to be reached at the arm 41 at a stable intensity. Further, in the present embodiment, the bottom wall 32 is formed with the concave-shaped surface 32a that is in confrontation with the pivot-center portion 42. Therefore, the distance between the light inlet 50 and the light-emitting element 63 can be made further hard to change. Further, when the convex-shaped pivot-center portion 42 and the concave-shaped surface 32a are concentrically positioned with respect to the pivotal center of the arm member 31 (i.e., the shaft 44) as in the present embodiment, the distance between the light inlet 50 and the light-emitting element 63 can be made constant regardless of the pivotal movement of the arm member 31. The pivot-center portion 42 may not be formed to have a spherical shape as a whole, but may only have an arcuate-shaped portion that confronts the light-emitting element 63.

Further, the light-emitting element 63 is provided on the cartridge loading portion 7, not on the ink cartridge 5. Therefore, the costs of the ink cartridge 5 alone can be lowered.

Next, various modifications to the first embodiment will be described with reference to FIGS. 4 through 11 wherein like parts and components are designated by the same reference numerals as those in the first embodiment to avoid duplicating description.

An ink cartridge 5A and a cartridge loading portion 7A according to a first modification of the first embodiment will be described first with reference to FIG. 4.

In the first modification, a light-emitting element 63A is provided at a main body 30A of the ink cartridge 5A, instead of the light-emitting element 63 of the first embodiment that is provided on the cartridge loading portion 7.

Figure 4:
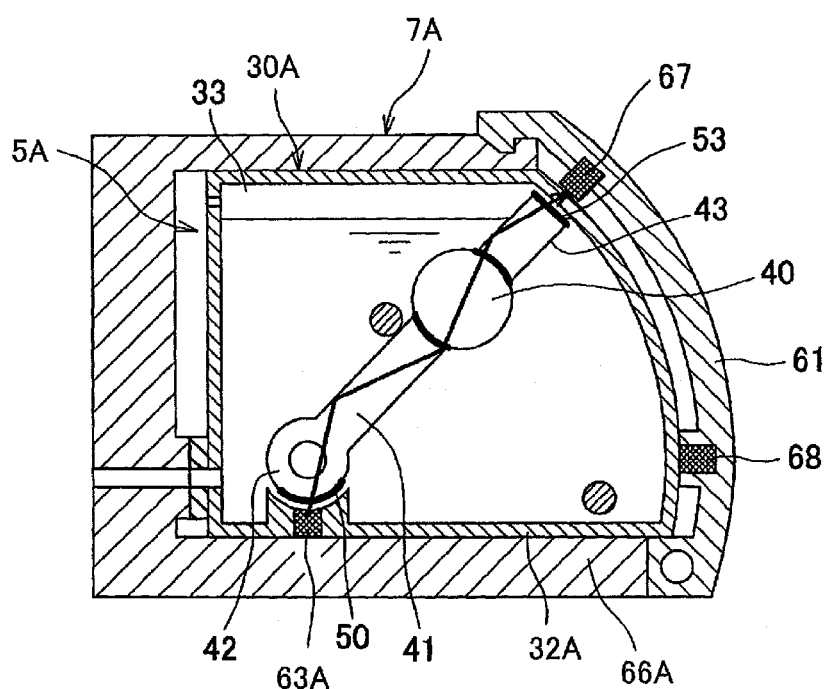
FIG. 4 is a vertical cross-sectional view of an ink cartridge and a cartridge loading portion according to a first modification of the first embodiment of the present invention.

More specifically, as shown in FIG. 4, the light-emitting element 63A is disposed within a protruding portion of a bottom wall 32A of the ink cartridge 5A so as to be in confrontation with the light inlet 50 of the pivot-center portion 42. Light emitted from the light-emitting element 63A is incident on the light inlet 50 and is guided within the arm 41 to reach the light outlet 53.

With this configuration, the light emitted from the light-emitting element 63A passes through the main body 30A of the ink cartridge 5A only once (when the light is irradiated outside from the light outlet 53). In contrast, in the first embodiment, the light emitted from the light-emitting element 63 needs to pass through the main body 30 of the ink cartridge 5 twice, i.e., first the bottom wall 32 and then the rear wall 34, until the light is received at the externally-provided light-receiving elements 67, 68. However, due to reflection and refraction, not all of the light emitted from the light-emitting element 63 can be received at the light-receiving elements 67, 68. Further, if the user happens to contaminate the main body 30 of the ink cartridge 5 at the time of handling the ink cartridge 5, the amount of light that passes through the main body 30 could also decrease. Therefore, in order to enhance accuracy of detection, the light should preferably pass through the main body 30 as less time as possible.

To this effect, according to the configuration of the first modification, the light passes the main body 30A of the ink cartridge 5A only once, thereby suppressing a decrease in the amount of light that occurs when the light passes through the main body 30A of the ink cartridge 5A. As a result, the light irradiated out of the light outlet 53 can be easily received externally at the light-receiving elements 67, 68.

Figure 5:
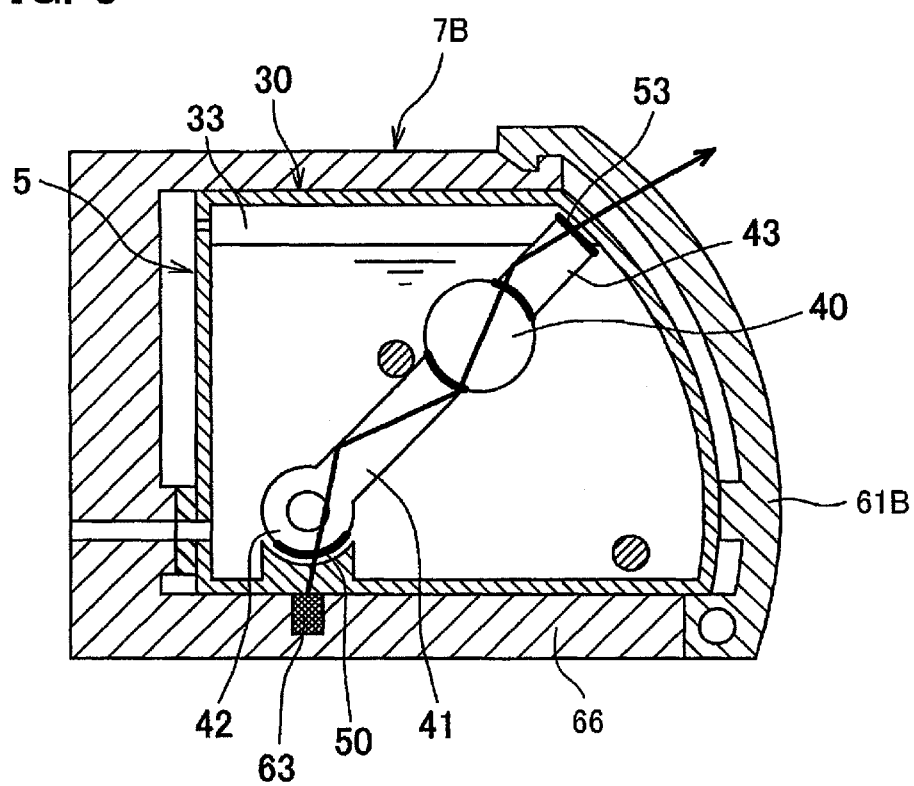
FIG. 5 is a vertical cross-sectional view of the ink cartridge according to the first embodiment and a cartridge loading portion according to a second modification of the first embodiment of the present invention.

FIG. 5 shows the ink cartridge 5 and a cartridge loading portion 7B according to a second modification of the first embodiment.

In the second modification, the light-receiving elements 67, 68 are not provided on a cover 61B of the cartridge loading portion 7B, as shown in FIG. 5. In other words, the user can visually confirm the light irradiated toward outside from the light outlet 53 when the cover 61B is opened. When the cover 61B is formed of a material having light-transmissive characteristics, the user can observe the light irradiated from the light outlet 53 without opening the cover 61B.

Further, even if the light-receiving elements 67, 68 are provided as in the first embodiment, the user can visually observe transition of the position of the irradiated light while the float 40 and the protruding portion 43 move from the light-receiving element 67 to the light-receiving element 68.

Figure 6:
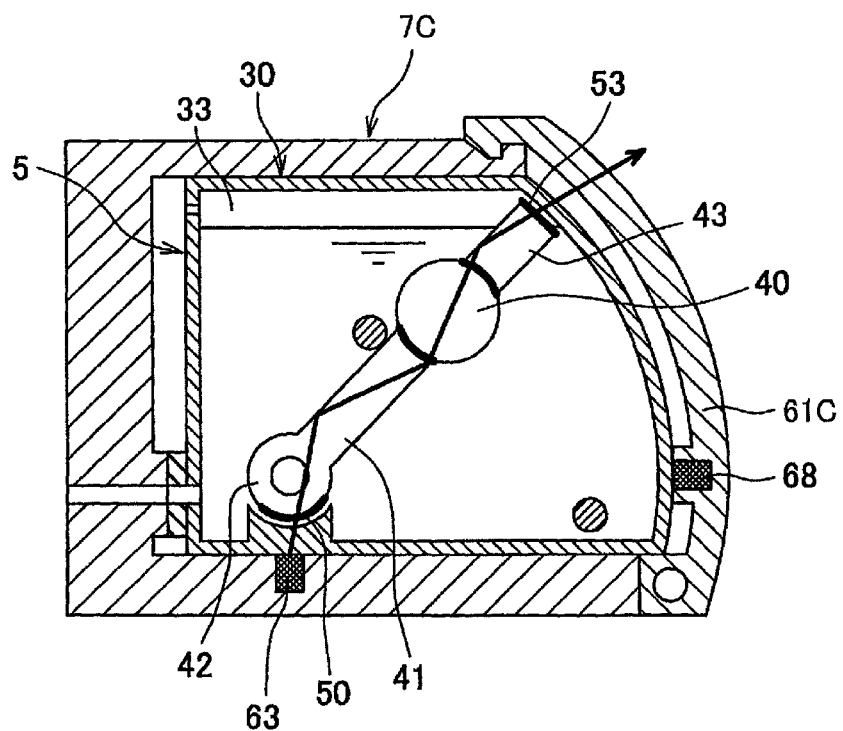
FIG. 6 is a vertical cross-sectional view of the ink cartridge according to the first embodiment and a cartridge loading portion according to a third modification of the first embodiment of the present invention.

FIG. 6 shows the ink cartridge 5 and a cartridge loading portion 7C according to a third modification of the first embodiment.

In the third modification, the light-receiving element 67 is dispensed with, while the light-receiving element 68 is provided on a cover 61C of the cartridge loading portion 7C, as shown in FIG. 6. With this configuration, not only whether the residual amount of ink is more than a predetermined amount can be electrically detected (in case of FIG. 6, whether or not there is little amount of ink in the ink chamber 33 can be detected), the user can also confirm intermediate fill levels of the ink in the ink chamber 33 by visually observing the current position of the float 40.

A cartridge loading portion 7D according to a fourth modification of the first embodiment will be described next. In the cartridge loading portion 7D, the ink cartridge 5 according to the first embodiment is accommodated.

In the fourth modification, user's visual confirmation of the light is also assumed. A cover 61D of the cartridge loading portion 7D has at least a portion that can transmit light. Specifically, this light-transmissive portion is arranged at a position on the cover 61D in coincidence with the rear wall 34 of the ink cartridge 5 (especially, the portion of the rear wall 34 from which the light from the light outlet 53 is emanated) when the cover 61D is closed. The light-transmissive portion may be formed of a material having light-transmissive characteristics, or may be a slit formed on the cover 61D. The rear wall 34 corresponds to a first wall, and the cover 61D corresponds to a cover having a portion with light-transmissive characteristics of the present invention.

With this configuration, even when the cover 61D is closed, the light from the light outlet 53 can be observed from outside through the light-transmissive portion of the cover 61D. Therefore, the user can confirm the residual amount of the ink within the ink cartridge 5 even when the cover 61D is closed.

Figure 7:
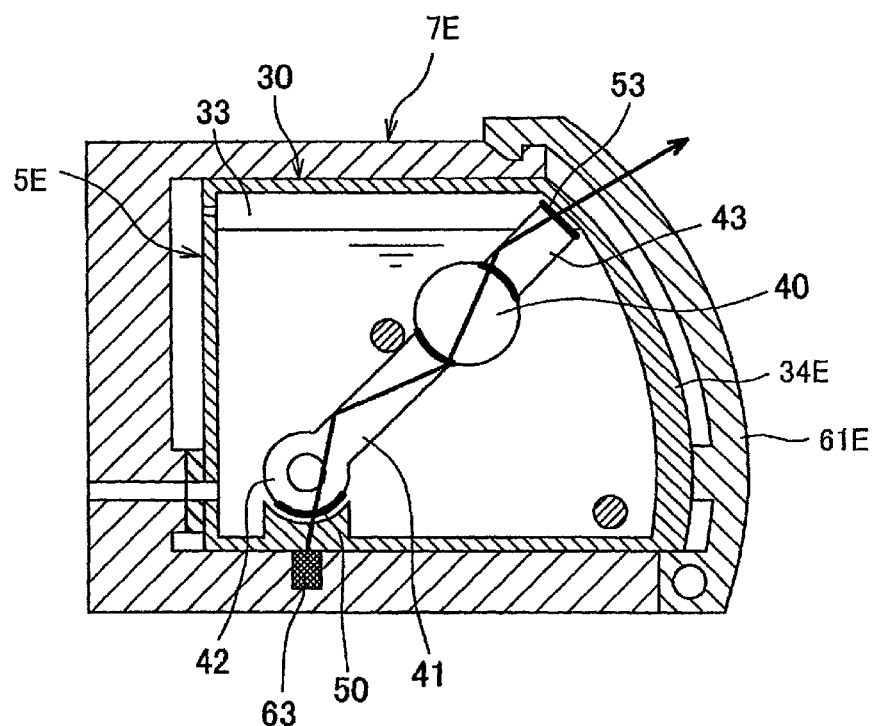
FIG. 7 is a vertical cross-sectional view of an ink cartridge and a cartridge loading portion according to a fifth modification of the first embodiment of the present invention.

FIG. 7 shows an ink cartridge 5E and a cartridge loading portion 7E according to a fifth modification of the first embodiment.

In the fifth modification, the amount of light irradiated from the light outlet 53 is made variant depending on the position of the float 40 (the protruding portion 43). Therefore, the user can be readily informed about the residual amount of ink based on the intensity of light irradiated from the light outlet 53, in addition to the position of the light.

More specifically, as shown in FIG. 7, a rear wall 34E of the ink cartridge 5E is formed to have a thickness that becomes smaller as the rear wall 34E extends upward in the vertical direction. This construction allows stronger light to be irradiated outside when the residual amount of ink is larger, while allowing lesser light to be irradiated as the residual amount of ink is smaller. Alternatively, the rear wall 34E may be formed to have a thickness that becomes smaller as the rear wall 34E extends downward in the vertical direction. In this case, stronger amount of light can be irradiated as the residual amount of ink is smaller, so that the user can be warned that the residual amount of ink is getting smaller.

Still alternatively, when a cover 61E is made of a light-transmissive material, the cover 61E may have a thickness that varies with respect to the vertical direction. With this configuration as well, due to the variation of the thickness of the cover 61E in the vertical direction, how much amount of light can be transmitted through the cover 61E can be also made variant.

Further alternatively, how much light can be transmitted through the rear wall 34E and the cover 61E can also be made variant with respect to the vertical direction by: fabricating the rear wall 34E or the cover 61E from materials having different light-transmissive capabilities from one another (for example, different types of synthetic resin); or partially attaching a film (capable of lowering translucency) to the rear wall 34E or the cover 61E; or alternatively by differentiating a distance between the light outlet 53 and the rear wall 34E.

A cartridge loading portion 7F according to a sixth modification of the first embodiment will then be described.

In the six modification, a light-emitting element 63F of the cartridge loading portion 7F functions to emit white light. As the light-emitting element 63F emitting white-colored light, a well-known white-color LED, an incandescent bulb, or a fluorescent bulb is available.

Since each ink cartridge 5 stores ink of a different color, when the white light emitted from the light-emitting element 63F is irradiated toward outside of the ink cartridge 5, the white light reflects the color of the ink existing between the light outlet 53 and the rear wall 34 of the ink cartridge 5. The irradiated light has therefore the same color as that of the ink. With this configuration, by looking at the color of the irradiated light, the user can confirm the color of the ink stored in each ink cartridge 5.

It should be noted that, when the light from the light outlet 53 is irradiated substantially upward as shown in FIG. 3A, the layer of air inevitably exists between the light outlet 53 and the rear wall 34 (the main body 30). In this case, the white light emitted from the light-emitting element 63F is never colored when exiting out of the main body 30. Therefore, in the sixth modification, the light from the light outlet 53 should be preferably irradiated in a substantially horizontal direction or downward so that the ink can be reliably interposed between the light outlet 53 and the rear wall 34.

Figure 8:
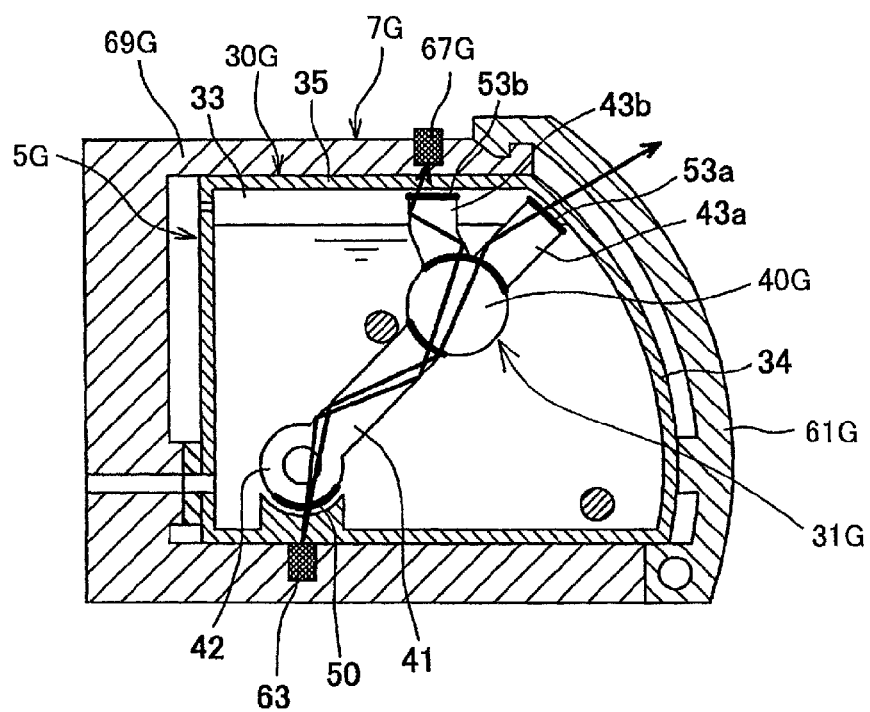
FIG. 8 is a vertical cross-sectional view of an ink cartridge and a cartridge loading portion according to a seventh modification of the first embodiment of the present invention.

FIG. 8 shows an ink cartridge 50 and a cartridge loading portion 7G according to a seventh modification of the first embodiment.

In the seventh modification, a float 400 is provided with two protruding portions 43a, 43b. The protruding portions 43a, 43b have light outlets 53a, 53b respectively from each of which the light emitted from the light-emitting element 63 is irradiated. When there is a sufficient amount of ink in the ink chamber 33 as shown in FIG. 8, the light outlet 53a is in opposition to the rear wall 34 of the main body 30, while the light outlet 53b is in opposition to the upper wall 35 of the main body 30. When the main body 30 as a whole is formed of a material having light-transmission capability as in the first embodiment, the upper wall 35 can transmit light. Therefore, the light traveling through an arm member 31G is irradiated from the light outlets 53a, 53b toward outside in two different directions via the rear wall 34 and the upper wall 35, as indicated by heavy lines in FIG. 8.

In this way, two beams of light can be simultaneously irradiated outward of the main body 30 from the two light outlets 53a; 53b. Therefore, each beam of light can be utilized for two different purposes.

In the seventh modification, a light-receiving element 67G is disposed at an upper wall section 69G of the cartridge loading portion 7G to enable the light-receiving element 67G to detect the light irradiated from the light outlet 53b. The light irradiated from the light outlet 53a can be used for user's visual confirmation of the residual amount of ink within the ink cartridge 50.

When the light-receiving element 67G is not provided on the upper wall section 69G, both beams of light from the light outlet 53a, 53b may be used for user's visual confirmation on the residual amount of ink within the ink cartridge 5G. In this case, since the user checks the amount of ink not only from rearward but also from above (through the upper wall section 69G), the upper wall section 69G should be formed of a light-transmissive material or be provided with either a window or a cut-out through which the user can actually observe the irradiated light.

An ink cartridge 5H and a cartridge loading portion 7H according to an eighth modification of the first embodiment will be described next.

In the eighth modification, the light irradiated from the light outlet 53 is designed to be emanated from any one of walls, other than the rear wall 34, constituting a main body 30H of the ink cartridge 5H. A light-receiving element 68H is therefore disposed on a wall section of the cartridge loading portion 7H that faces the wall of the main body 30H from which the light is emanated. For example, if the light is irradiated outside through a front wall 36H of the main body 30H, the light-receiving element 68H is disposed on a front wall section 65H of the cartridge loading portion 7H. In this case, since the light-receiving element 68H is positioned at a deeper side from the user (frontward in the loading direction), the user is unlikely to contact the light-receiving element 68H.

Figure 9:
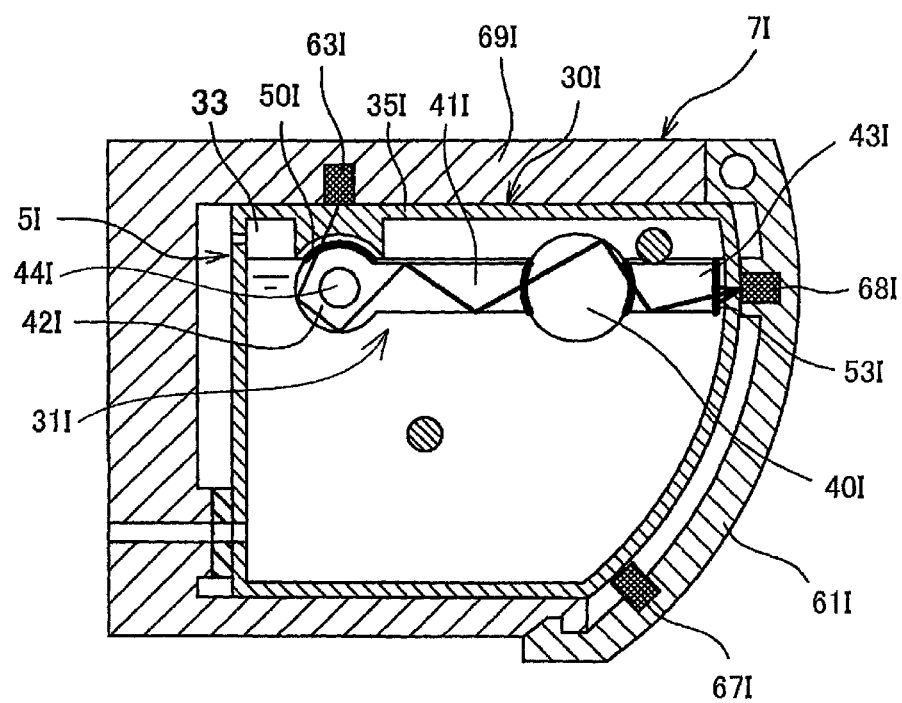
FIG. 9 is a vertical cross-sectional view of an ink cartridge and a cartridge loading portion according to a ninth modification of the first embodiment of the present invention.

FIG. 9 shows an ink cartridge 5I and a cartridge loading portion 7I according to a ninth modification of the first embodiment.

Contrary to the first embodiment where the pivot-center portion 42 is disposed in the vicinity of the bottom wall 32 of the main body 30, a pivot-center portion 42I of an arm member 31I of the ninth modification is disposed at a position adjacent to an upper wall 35I of a main body 30I. More specifically, as shown in FIG. 9, the pivot-center portion 42I is arranged at a position in the vertical direction substantially the same as that of a float 40I which is held at its upper-limit position. A light-emitting element 63I is disposed on an upper wall section 69I of the cartridge loading portion 7I. The pivot-center portion 42I is arranged to be in confrontation with the light-emitting element 63I so that light from the light-emitting element 63I can be incident on a light inlet 50I.

With this configuration, even when a sufficient amount of ink is left in the ink cartridge 5I, the layer of air is available between the upper wall 35I and the ink (the liquid surface of the ink). This means that air is interposed between the light inlet 50I of the pivot-center portion 42I and the light-emitting element 63I, and therefore the light emitted from the light-emitting element 63I can be reliably reached at the light inlet 50I.

Further, a cover 61I has an upper end that is pivotally movably supported to the upper wall section 69I, as shown in FIG. 9. Therefore, the user needs to open the cover 61I from below. This configuration contributes to prevention of the user' contact with the light-receiving elements 67I, 68I disposed on an inner surface of the cover 61I. It should be noted, however, that this configuration of the cover 61I (the cover 61I is opened from its bottom side) may possibly become an obstacle for installation/removal of the ink cartridge 5I and/or for the user's visual observation of the residual amount of ink (the position of the float 40I). In this point of view, the configuration of the cover 61 according to the first embodiment (the cover 61 is opened from its top side) is preferable to that of the cover 61I of the ninth modification.

Figure 10:
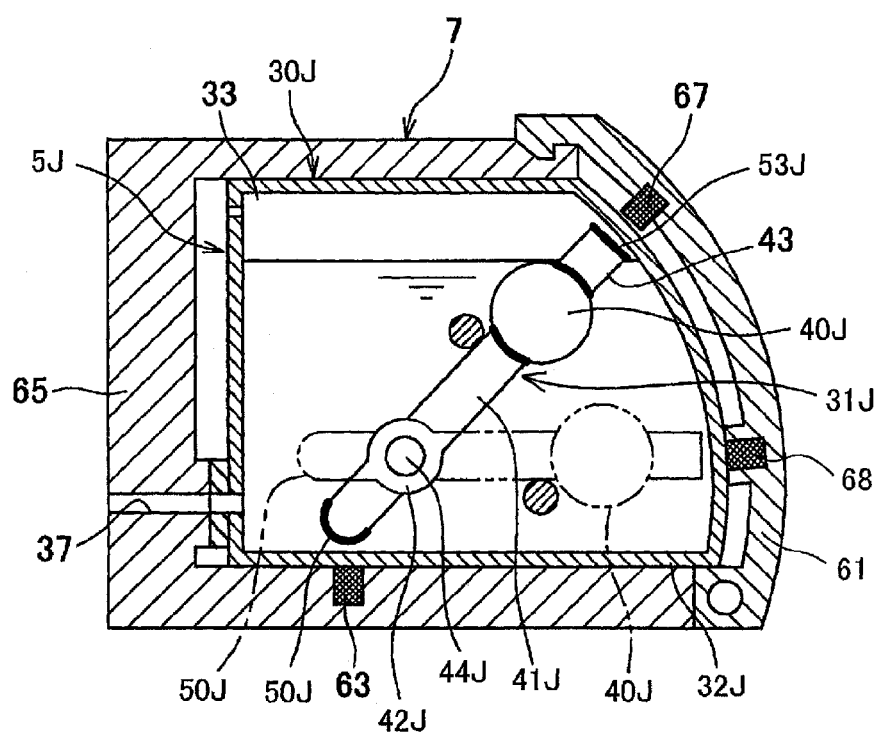
FIG. 10 is a vertical cross-sectional view of an ink cartridge according to a tenth modification of the first embodiment of the present invention and the cartridge loading portion according to the first embodiment.

FIG. 10 shows an ink cartridge 5J according to a tenth modification of the first embodiment and the cartridge loading portion 7.

In the tenth modification, an arm 41J of an arm member 31J has one end on which a light inlet 50J is formed and has another end to which a float 40J is connected. A pivot-center portion 42J is arranged on the arm 41J at a position midway between the light inlet 50J and the float 40J. The light inlet 50J provided at the one end of the arm 41J is adapted to face the light-emitting element 63 formed on the bottom wall section 66 of the cartridge loading portion. However, in the tenth modification, since the arm member 31J pivotally moves about a shaft 44J of the pivot-center portion 42J in accordance with the position of the float 40J, a distance between the light inlet 503 and the light-emitting element 63 varies depending on the position of the float 40J.

More specifically, as the amount of ink in the ink chamber 33 decreases, the arm member 31J pivotally moves about the shaft 44J in a clockwise direction in FIG. 10 due to the downward movement of the float 40J. Since the light inlet 50I moves in conjunction with the movement of the arm member 31J, the distance between the light inlet 50J and the light-emitting element 63 is subjected to change. Therefore, the amount of light guided from the light inlet 50J to a light outlet 53J inevitably changes. That is, the amount of light irradiated outward from the light outlet 53J changes in accordance with the residual amount of ink. The user can be advised of how much ink remains in the ink cartridge 5J by checking the intensity of light coming out of the ink cartridge 5J, in addition to by visually confirming the position of the float 40J.

In the tenth modification, as shown in FIG. 10, the distance between the light inlet 50J and the light-emitting element 63 is small when a sufficient amount of ink is left in the ink chamber 33. Therefore, the amount of light irradiated outward from the light outlet 53J is large. As the ink decreases, the amount of light irradiated out of the light outlet 53J becomes smaller since the distance between the light inlet 50I and the light-emitting element 63 becomes longer. However, alternatively, the amount of light irradiated outward of the ink cartridge 5J may be configured to increase as the residual amount of ink decreases. In this case, the distance between the light inlet 50J and the light-emitting element 63 is designed to be smaller in accordance with decrease in the residual amount of ink. Specifically, the light-emitting element 63 may be arranged at the front wall section 65 at a position above the ink outlet port 37. With this configuration, when the float 40J moves down as the ink decreases (a state shown by a double-dotted chain line in FIG. 10), the light inlet 50J is moved upward to be closer to the light-emitting element 63 disposed at the front wall section 65. Therefore, the amount of light guided within the arm member 31J i.e., the amount of light irradiated outside from the light outlet 53J increases.

Figure 11:
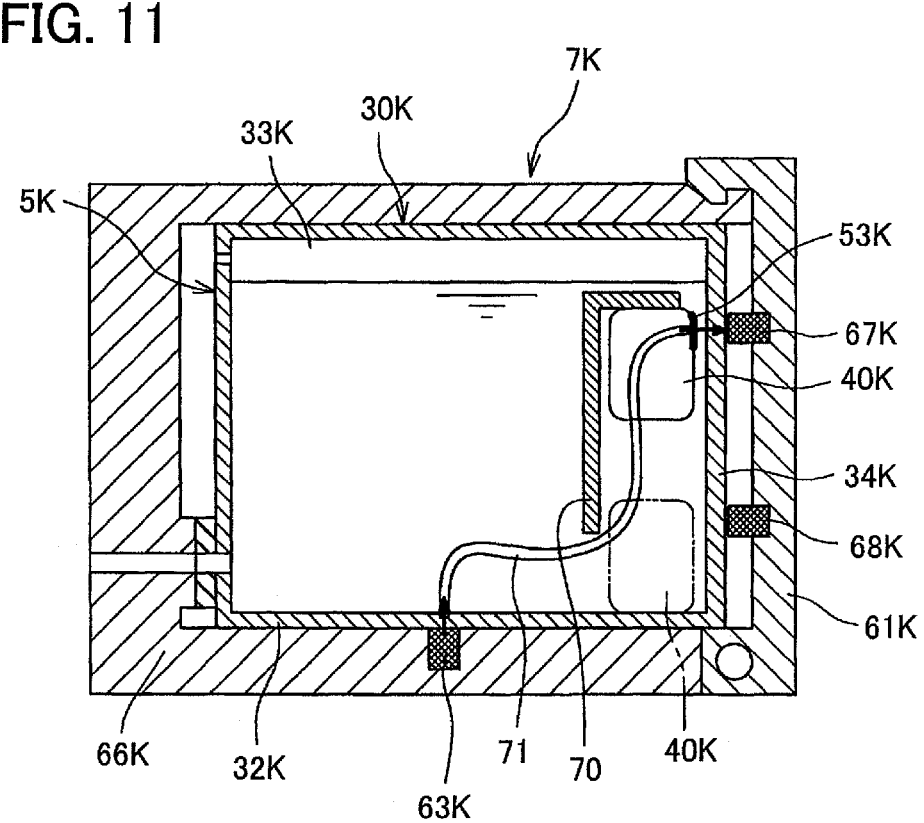
FIG. 11 is a vertical cross-sectional view of an ink cartridge and a cartridge loading portion according to an eleventh modification of the first embodiment of the present invention.

FIG. 11 shows an ink cartridge 5K and a cartridge loading portion 7K according to an eleventh modification of the first embodiment.

In the eleventh modification, the arm member 31 of the first embodiment is dispensed with and a float 40K alone is vertically movably provided within an ink chamber 33K of the ink cartridge 5K. A guide portion 70 is disposed within the ink chamber 33K so as to guide the float 40K to vertically move along a rear wall 34K of the ink cartridge 5K. A light outlet 53K is provided at the float 40K.

A light-emitting element 63K is disposed at a bottom wall section 66K of the cartridge loading portion 7K and light-receiving elements 67K, 68K are arranged at an inner surface of a cover 61K. In order to guide the light emitted from the light-emitting element 63K to the light outlet 53K of the float 40K, an optical fiber cable 71 is used for connecting the light outlet 53K and the light-emitting element 63K. The optical fiber cable 71 corresponds to the light guiding portion of the present invention.

More specifically, the optical fiber cable 71 has one end positioned at a bottom wall 32K of a main body 30K of the ink cartridge 5K for receiving light from the light-emitting element 63K disposed on the bottom wall section 66K. The optical fiber cable 71 has another end arranged in the vicinity of the light outlet 53K of the float 40K so that the light from the light-emitting element 63K can be reliably guided to the light outlet 53K.

The another end of the optical fiber cable 71 may not necessarily be inserted within the float 40K, but may be attached to an outer surface of the float 40K. In this case, the light guided to the float 40K through the optical fiber cable 71 is directly irradiated toward the rear wall 34K without traversing the float 40K.

An ink cartridge 205 and a cartridge loading portion 207 according to a second embodiment will be described next with reference to FIGS. 12 to 13B. The ink cartridge 205 of the second embodiment has a configuration identical to that of the ink cartridge 5 of the first embodiment except that a protruding portion 243 is provided with a light-emitting element 263. Like parts and components are designated by the same reference numerals as those of the first embodiment to avoid duplicating description.

Figure 12:
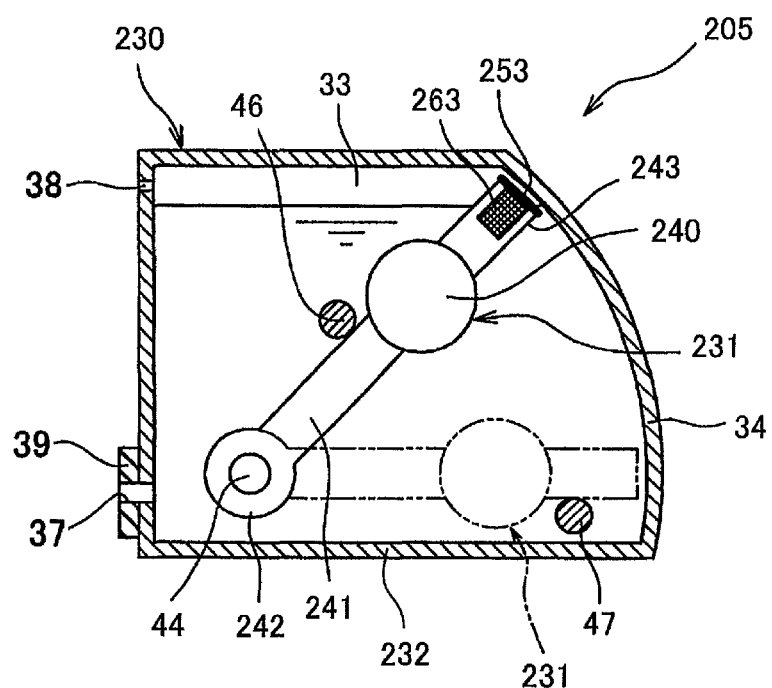
FIG. 12 is a vertical cross-sectional view of an ink cartridge and a cartridge loading portion according to a second embodiment of the present invention taken along a plane including a loading direction of the ink cartridge.
Figure 13A:
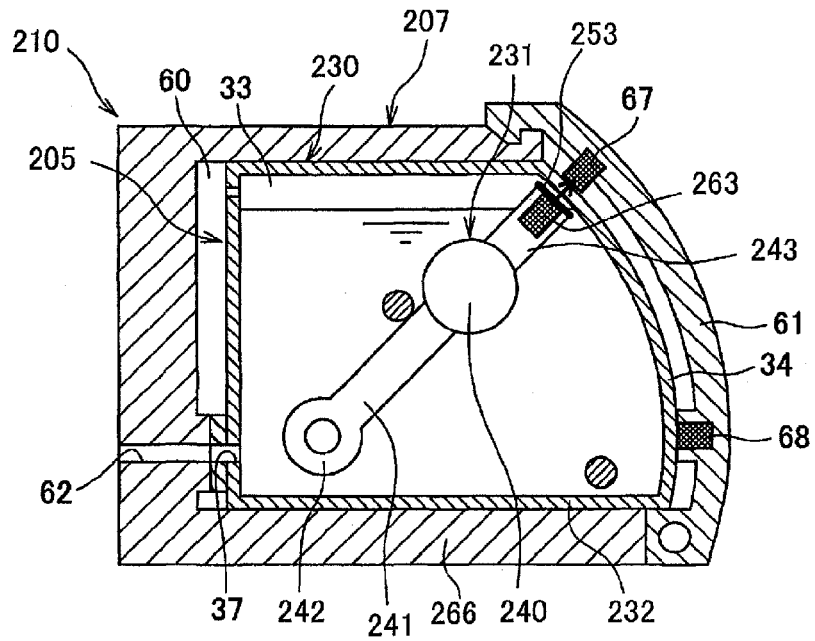
FIG. 13A is a vertical cross-sectional view of the ink cartridge and the cartridge loading portion according to the second embodiment, wherein the ink cartridge stores a sufficient amount of ink therein.
Figure 13B:
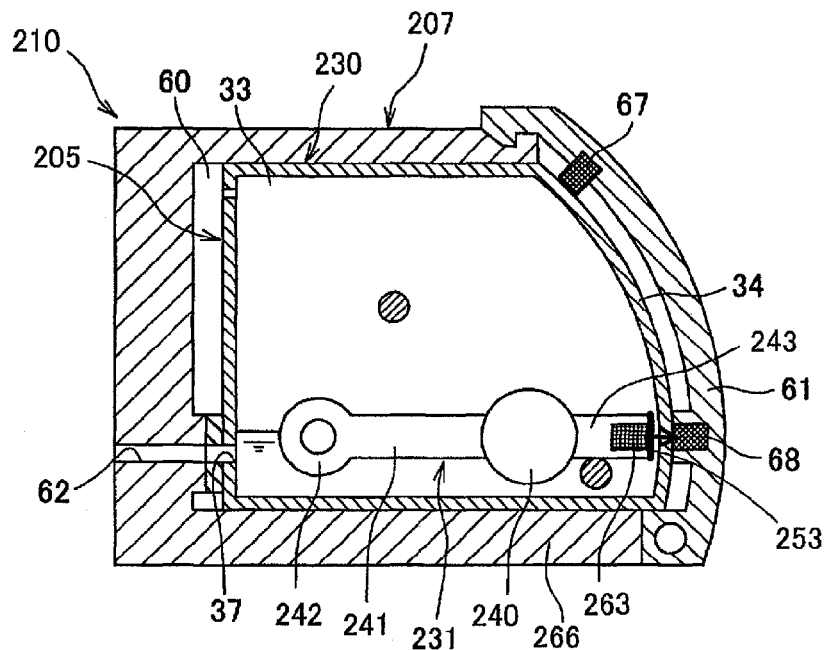
FIG. 13B is a vertical cross-sectional view of the ink cartridge and the cartridge loading portion according to the second embodiment, wherein the ink cartridge stores a small amount of ink therein.

As shown in FIGS. 12 through 13B, the ink cartridge 205 includes a main body 230 defining the ink chamber 33 therein and an arm member 231 provided within the ink chamber 33 for detecting residual amounts of ink.

The arm member 231 is different from the arm member 31 of the first embodiment in that the light-emitting element 263 is arranged within the protruding portion 243. Therefore, no light-emitting element is provided at the cartridge loading portion 207. The protruding portion 243 has a tip end having light-transmissive characteristics so that the tip end can serve as a light outlet 253 from which light emitted from the light-emitting element 263 can be irradiated outward. Thus, the light emitted the light-emitting element 263 can be irradiated outside of the main body 230 through the rear wall 34 that can transmit light.

As in the first embodiment, the light-receiving elements 67, 68 are adapted to receive the light irradiated from the light outlet 253 that moves in accordance with the residual amount of ink within the ink chamber 33. Therefore, two positions of a float 240, i.e., the ink remaining in the ink chamber 33 can be detected at two levels at the inkjet printer 1. If more than three light-receiving elements are provided on the cartridge loading portion 207, the residual amount of ink can be detected at more than three levels.

Further, in the second embodiment, the light-emitting element 263 is disposed at the protruding portion 243 movable in conjunction with the float 240. Since the light irradiated from the light outlet 253 can pass through the main body 230 only once until the light exits outside of the main body 230, reduction in the amount of light that inevitably occurs when the light passes through the main body 230 can be suppressed compared to a conventional ink cartridge in which light needs to pass therethrough twice. Therefore, the light coming out of the ink cartridge 205 can be detected easily at the cartridge loading portion 207.

In the second embodiment, since the light-emitting element 263 is positioned at the protruding portion 243 that is provided within the ink chamber 33, an electrical connection is required to supply power from the cartridge loading portion 207 to the light-emitting element 263. For example, wirings for supplying power may be provided from an outer surface of the ink cartridge 205 to the light-emitting element 263 via the shaft 44 and an internal space formed within the arm member 231. Alternatively, a primary coil may be disposed on the cartridge loading portion 207, while a secondary coil connected to the light-emitting element 263 may be disposed on the ink cartridge 205. For example, the secondary coil may be disposed within the float 240 or the protruding portion 243. In this case, application of electricity to the primary coil causes a magnetic field between the primary coil and the secondary coil to change, generating an induced current across the secondary coil.

The light-emitting element 263 may not necessarily be disposed within the protruding portion 243 as in the second embodiment, but may be attached to an outer surface of the float 240 or the protruding portion 243. In this case, the light emitted from the light-emitting element 263 does not travel through walls of the float 240 or the protruding portion 243, but is irradiated directly toward the rear wall 34 of the main body 230.

Various modifications to the second embodiment are also conceivable.

To the ink cartridge 205 of the second embodiment, modifications made to the ink cartridge 5 of the first embodiment may also be applicable. For example, omission of the light-receiving elements 67, 68 (second and third modifications: FIGS. 5 and 6); change in light-transmission status of the cover 61 (the covers 61D, 61E of the fourth and fifth modifications: FIG. 7); provision of the light-emitting element that emits white light (the light-emitting element 63F of the sixth modification) can also be applicable to the ink cartridge 205 of the second embodiment.

Figure 14:
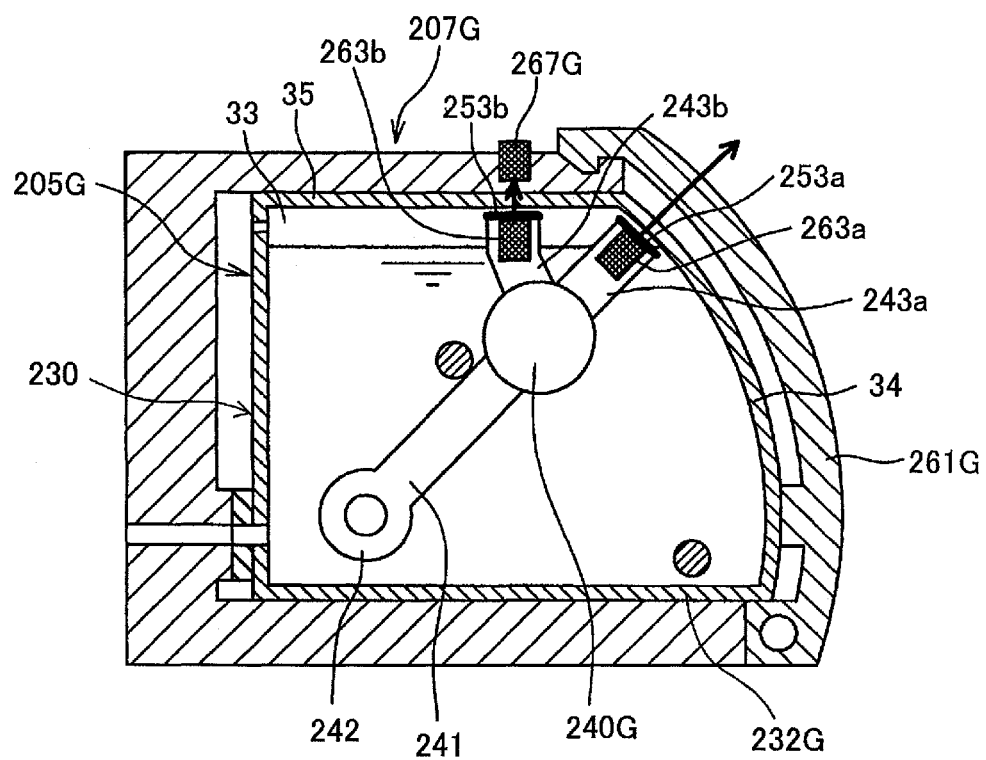
FIG. 14 is a vertical cross-sectional view of an ink cartridge and a cartridge loading portion according to a variation of the second embodiment, wherein the seventh modification of the first embodiment is applied to the ink cartridge and the cartridge loading portion of the second embodiment.

FIG. 14 shows an ink cartridge 205G and a cartridge loading portion 207G according to a variation of the second embodiment in which the seventh modification to the first embodiment is applied to the ink cartridge 205 and the cartridge loading portion 207 of the second embodiment. A float 240G has two protruding portions 243a, 243b which accommodate therein light-emitting element 263a, 263b respectively. The protruding portions 243a, 243b are respectively formed with light outlets 253a, 253b in correspondence with the light-emitting elements 263a, 263b.

When the ink is sufficient in the ink chamber 33, light from the light-emitting elements 263a, 263b is irradiated from the light outlet 253a, 253b outward via the rear wall 34 and the upper wall 35 that can transmit light therethrough. The light irradiated from the light outlet 253a is visually confirmed by the user through the rear wall 34, while the light irradiated from the light outlet 253b is electrically detected by a light-receiving element 267G disposed at an upper wall section 269G of the cartridge loading portion 207G.

The following modifications made to the ink cartridge 5 of the first embodiment can also be applied to the ink cartridge 205 of the second embodiment: change in the direction of light irradiated outward from the light outlet 53 (eighth modification); change in the position of the pivot-center portion 42 within the ink chamber 33 (the pivot-center portion 42I of the ninth modification: FIG. 9); change in the position of the pivot-center portion 42 at the arm member 31 (the pivot-center portion 42I of the tenth modification: FIG. 10); and change in the configuration of the float 40 (the float 40K of the eleventh modification: FIG. 11).

Other modifications can also be made to the ink cartridge 5 of the first embodiment and to the ink cartridge 205 of the second embodiment.

For example, the main body 30 according to the first embodiment and the main body 230 of the second embodiment are, as a whole, formed of a material capable of transmitting light, such as synthetic resin. However, only a portion of the main bodies 30(230) where light irradiated from the light outlets 53(253) passes through may be allowed to transmit the irradiated light. For example, in case of the main body 30 of the first embodiment shown in FIG. 3, only portions of the rear wall 34 that are in confrontation with the light-receiving elements 67, 68 of the cover 61 can be made of a material of light transmissive characteristics, while remaining portions of the rear wall 34 may have characteristics to block light.

Further, the loading direction of the ink cartridge is not necessary to be horizontal, but may be a direction other than horizontal direction. For example, the present invention may also be applicable to an ink cartridge that is mounted in the vertical direction.

A member adapted to move in accordance with the residual amount of ink and to irradiate light outward is not limited to a float that moves in the vertical direction as in the first and second embodiments, provided that the member moves according to a variation of the amount of ink. For example, a float that vertically moves in accordance with residual amounts of ink may be connected to a moving member within an ink chamber. The moving member is allowed to move in a prescribed direction different from the vertical direction in which the float moves, due to some kind of direction conversion mechanism that can convert the vertical movement of the float into the movement of the moving member in the prescribed direction. Such a mechanism may be configured of well-known mechanical elements, such as a link mechanism or a pivotally-moving mechanism.

The present embodiment has been applied to an ink cartridge to be used in an inkjet printer in the above-described embodiments. However, the present invention can also be applied to other cartridges, regardless of types of liquid stored in the cartridges or intended purposes of the cartridges, as long as such cartridges are provided with a main body for storing liquid therein and a moving member that moves in accordance with an amount of the liquid within the main body.

While the invention has been described in detail with reference to the embodiments thereof, it would be apparent to those skilled in the art that various changes and modifications may be made therein without departing from the scope of the invention.

What is claimed is:

1. A liquid cartridge detachably loadable in a cartridge loading section of a liquid supplying device, the liquid cartridge comprising:
   a main body defining therewithin a liquid accommodation chamber storing liquid therein, the liquid accommodation chamber having a light-transmission portion transmitting light therethrough;
   a moving member disposed within the liquid accommodation chamber and configured to move in accordance with an amount of the liquid;
   a light outlet configured to move in conjunction with the movement of the moving member; and
   a light guiding portion configured to guide incident light toward the light outlet, the light outlet irradiating light coming from the light guiding portion toward outside of the main body via a position on the light-transmission portion, the position varying in accordance with the amount of the liquid in the liquid accommodation chamber.

2. The liquid cartridge according to claim 1, further comprising a light-emitting element configured to emit light, the light-emitting element being provided at the main body, and the light emitted from the light-emitting element being incident on the light guiding portion and being guided to the light outlet by the light guiding portion.

3. The liquid cartridge according to claim 1, wherein the light guiding portion is configured to guide the light emitted from the liquid supplying device toward the light outlet.

4. The liquid cartridge according to claim 1, wherein the light guiding portion comprises an arm member pivotally movably supported to the main body, the arm member having a first portion on which light can be incident, a second portion connected to the moving member, the first portion and the second portion transmitting light, and a third portion whose inner surface reflects light to direct the light toward the light outlet.

5. The liquid cartridge according to claim 4, wherein the arm member includes an arm and a pivot-center portion having a shaft about which the arm is pivotally movable, the first portion being provided at the pivot-center portion.

6. The liquid cartridge according to claim 5, wherein the first portion is formed in an arcuate shape projecting outward from the pivot-center portion.

7. The liquid cartridge according to claim 5, wherein the main body includes an upper wall, the pivot-center portion being disposed adjacent to the upper wall of the main body.

8. The liquid cartridge according to claim 4, wherein the arm member includes an arm and a pivot-center portion having a shaft about which the arm is pivotally movable, the pivot-center portion being positioned between the first portion and the second portion in the arm member, wherein the first portion defines a distance therefrom to a position at the main body from which the incident light is emitted, the distance varying in accordance with the movement of the moving member.

9. The liquid cartridge according to claim 1, wherein the light guiding portion comprises an optical fiber cable connected to the moving member, the optical fiber cable guiding the incident light toward the light outlet.

10. The liquid cartridge according to claim 1, wherein the liquid accommodation chamber is formed with two light-transmission portions at two different positions, and the light outlet is configured of two light exits each confronting each of the two light-transmission portions simultaneously, each light exit irradiating the light guided thereto by the light guiding portion outside of the main body via the corresponding light-transmission portion.

11. The liquid cartridge according to claim 1, wherein the liquid cartridge is loaded in the cartridge loading section in a loading direction, the main body having a first wall which is a trailing side in the loading direction, the light-transmission portion being provided at the first wall, and
   wherein the light outlet is configured to irradiate the light emitted from the light-emitting element toward the light-transmission portion provided at the first wall.

12. The liquid cartridge according to claim 1, wherein the light outlet is configured to irradiate the light substantially upward when the amount of the liquid stored in the liquid accommodation chamber is not less than a prescribed amount.

13. The liquid cartridge according to claim 1, wherein the light outlet is arranged to be in opposition to the light-transmission portion with a prescribed gap interposed therebetween, and
   wherein the light irradiated from the light outlet is white light.

14. The liquid cartridge according to claim 1, wherein the main body has a first wall formed with a liquid outlet port through which the liquid in the liquid accommodation chamber is configured to flow out therefrom; and
   wherein the light from the light outlet is irradiated in a direction parallel to a plane perpendicular to the first wall and in which the light outlet moves in accordance with the amount of liquid.

15. A liquid supplying device comprising:
   a liquid cartridge;
   a cartridge loading section configured to accommodate therein the liquid cartridge; and
   a light-emitting element configured to emit light toward the liquid cartridge, the liquid cartridge including:
   a main body defining therewithin a liquid accommodation chamber storing liquid therein, the liquid accommodation chamber having a light-transmission portion transmitting light therethrough;
   a moving member disposed within the liquid accommodation chamber and configured to move in accordance with an amount of the liquid;
   a light outlet configured to move in conjunction with the movement of the moving member; and
   a light guiding portion configured to guide the light emitted from the light-emitting element toward the light outlet, the light outlet irradiating the light coming from the light guiding portion toward outside of the main body via a position on the light-transmission portion, the position varying in accordance with the amount of the liquid in the liquid accommodation chamber.

16. The liquid supplying device according to claim 15, further comprising a light-receiving element configured to receive the light irradiated from the light outlet.

17. The liquid supplying device according to claim 16, wherein, when the liquid cartridge is loaded in the cartridge loading section, the light outlet is configured to irradiate light substantially upward when the amount of the liquid stored in the liquid accommodation chamber is greater than or equal to a prescribed amount, and
   wherein the light-receiving element is disposed at a position substantially upward of the loaded liquid cartridge to receive the light irradiated from the light outlet.

18. The liquid supplying device according to claim 15, further comprising a plurality of light-receiving elements configured to receive the light irradiated from the light outlet, wherein the moving member moves in a moving direction in accordance with the amount of the liquid, the plurality of light-receiving elements being aligned in the moving direction.

19. The liquid supplying device according to claim 15, further comprising a cover configured to cover the liquid cartridge loaded in the cartridge loading section, wherein the main body having a first wall that is positioned at a trailing side in a loading direction in which the liquid cartridge is loaded in the cartridge loading section, the light-transmission portion being provided at the first wall;
   the light outlet is configured to irradiate the light the light emitted from the light-emitting element toward the light-transmission portion provided at the first wall; and
   the cover covers the first wall when the liquid cartridge is loaded in the cartridge loading section, the cover having a portion with light-transmissive characteristics, the portion covering the light-transmission portion provided on the first wall.

\* \* \* \* \*